(12) United States Patent
Bareli

(10) Patent No.: US 7,808,484 B1
(45) Date of Patent: Oct. 5, 2010

(54) SQUEEZABLE COMPUTER MOUSE

(76) Inventor: Bezalel Sol Bareli, 516 Edward Ave., Woodmere, NY (US) 11598

( * ) Notice: Subject to any disclaimer, the term of this patent is extended or adjusted under 35 U.S.C. 154(b) by 739 days.

(21) Appl. No.: 11/755,058

(22) Filed: May 30, 2007

Related U.S. Application Data

(60) Provisional application No. 60/885,915, filed on Jan. 21, 2007.

(51) Int. Cl.
*G06F 3/033* (2006.01)

(52) U.S. Cl. .......................................... 345/163; 463/37

(58) Field of Classification Search ................. 345/156, 345/157, 163, 164, 165, 166, 167; 715/700, 715/701, 702; 463/37; 200/333
See application file for complete search history.

(56) References Cited

U.S. PATENT DOCUMENTS

| | | | |
|---|---|---|---|
| 5,006,836 A | 4/1991 | Cooper | |
| 5,122,785 A | 6/1992 | Cooper | |
| 5,287,089 A | 2/1994 | Parsons | |
| 5,379,053 A | 1/1995 | Steinberg | |
| 5,717,610 A | 2/1998 | Baba | |
| 5,923,318 A | 7/1999 | Zhai et al. | |
| 6,094,190 A | 7/2000 | Kodim | |
| 6,104,383 A | 8/2000 | Shipman | |
| 6,195,085 B1 | 2/2001 | Becker et al. | |
| 6,323,843 B2 | 11/2001 | Giles et al. | |
| 6,362,811 B1 | 3/2002 | Edwards et al. | |
| 6,377,244 B1 | 4/2002 | Reid et al. | |
| 6,417,837 B1 | 7/2002 | Baba | |
| 6,441,805 B1 | 8/2002 | Reid et al. | |
| 6,599,259 B2 | 7/2003 | Muir | |
| 6,828,958 B2 | 12/2004 | Davenport | |
| 6,853,365 B2 | 2/2005 | Reid et al. | |
| 6,922,186 B2 | 7/2005 | Whitcomb | |
| 6,937,227 B2 | 8/2005 | Qamhiyah et al. | |
| 7,063,321 B2 | 6/2006 | Hussaini et al. | |
| 7,154,475 B2 * | 12/2006 | Crew | 345/163 |
| 7,535,458 B2 * | 5/2009 | Farag et al. | 345/163 |
| 7,683,883 B2 * | 3/2010 | Touma et al. | 345/163 |
| 2004/0189606 A1 | 9/2004 | Powpong | |
| 2006/0274042 A1 | 12/2006 | Krah et al. | |
| 2007/0139376 A1 | 6/2007 | Giles | |

\* cited by examiner

*Primary Examiner*—Abbas I Abdulselam

(57) ABSTRACT

Cursor control device for controlling a cursor on a screen of a computer includes an outer casing, an inner casing arranged inside the outer casing, a sensor arrangement for detecting application of pressure to the outer casing above a pre-determined magnitude, and hardware coupled to the sensor arrangement for converting the application of pressure to the outer casing into signals indicative of the application of such pressure. These signals are provided by the hardware to a computer having a screen with the cursor thereon to enable control of the cursor. The sensor arrangement may include a conductive mesh on an inner surface of the outer casing and a conductive covering on the outer surface of the inner casing with a space being present therebetween. Squeezing the outer casing causes the conductive mesh to contact the conductive covering thereby completing an electrical circuit which is detected by the hardware.

20 Claims, 2 Drawing Sheets

SQUEEZABLE COMPUTER MOUSE

CROSS-REFERENCE TO RELATED APPLICATION

This application claims priority under 35 U.S.C. §119(e) of U.S. provisional patent application Ser. No. 60/885,915 filed Jan. 21, 2007, which is incorporated by reference herein.

FIELD OF THE INVENTION

The present invention relates generally to a device for controlling a cursor on a computer screen and more particularly to a computer mouse capable of controlling actuation of functions graphically represented on the computer screen.

BACKGROUND OF THE INVENTION

A very common way to navigate on a computer screen or display is by using a cursor control device commonly referred to as a computer mouse, which controls a cursor or other indicator on the screen or display. A computer mouse is typically grasped by the user's hand and includes one or more buttons which are depressed by one of the user's fingers, usually the pointer finger, to create a "click". A "click" is transformed into a signal by the mouse and directed to the computer where it may be associated with a function graphically represented at the location at which the cursor is located, or used to perform other screen manipulating functions. Often there are two buttons on the mouse associated with internal switches, one for a left "click" and one for a right "click".

When using a computer mouse, the user's forearm is relaxed at a horizontal position on a flat surface and most of the muscles of the hand are not utilized. Consequently, it would be desirable to enable use of a computer mouse to provide exercise for the user and/or better blood circulation. In this manner, the user would be exercising or obtain the benefits of better blood circulation while engaged in a normal work activity.

OBJECTS AND SUMMARY OF THE INVENTION

It is a general object of the present invention to provide a new and improved cursor control device.

It is another object of one or more embodiments of the present invention to provide a new and improved cursor control device which enables a user to improve the muscular skeleton strength of their hand and/or offer better blood circulation.

In order to achieve one or both of these objects and possibly others, a first embodiment of a cursor control device in accordance with the invention includes an outer casing, an inner casing arranged inside of the outer casing, a sensor arrangement for detecting application of pressure to the outer casing above a pre-determined magnitude, and hardware arranged in connection with the inner casing and coupled to the sensor arrangement for converting the application of pressure to the outer casing detected by the sensor arrangement into signals indicative of the application of such pressure. These signals are provided by the hardware to a computer having a screen with the cursor thereon to enable control of the cursor.

Although various sensor arrangements are envisioned, one sensor arrangement includes a conductive mesh arranged on an inner surface of the outer casing, a conductive covering arranged on an outer surface of the inner casing and an at least partially conductive ring arranged in connection with a base and electrically connecting the conductive mesh and the conductive covering. Application of pressure to the outer casing above a pre-determined magnitude causes the conductive mesh to pass through a space between the inner and outer casings and contact the conductive covering. This completes an electrical circuit which is detected by the hardware which then generates the signal indicative of the application of pressure to the outer casing based thereon and provides it to the computer. Different types of squeezing may be converted into different signals, e.g., based on the duration of the squeeze.

By forming a squeezable cursor control device, a user unavoidably exercises their hands while using the device to control a computer. Thus, a form of exercise is created which is easily performed and provides significant medical benefits to the user.

Other and further objects, advantages and features of the present invention will be understood by reference to the following specification in conjunction with the annexed drawings.

BRIEF DESCRIPTION OF THE DRAWINGS

The invention, together with further objects and advantages thereof, may best be understood by reference to the following description taken in conjunction with the accompanying drawings wherein like reference numerals identify like elements.

DETAILED DESCRIPTION OF THE INVENTION

Figure 1:
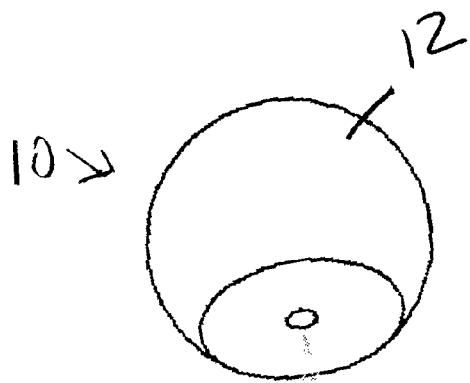
FIG. 1 is a bottom perspective view of a cursor control device in accordance with the invention.
Figure 2:
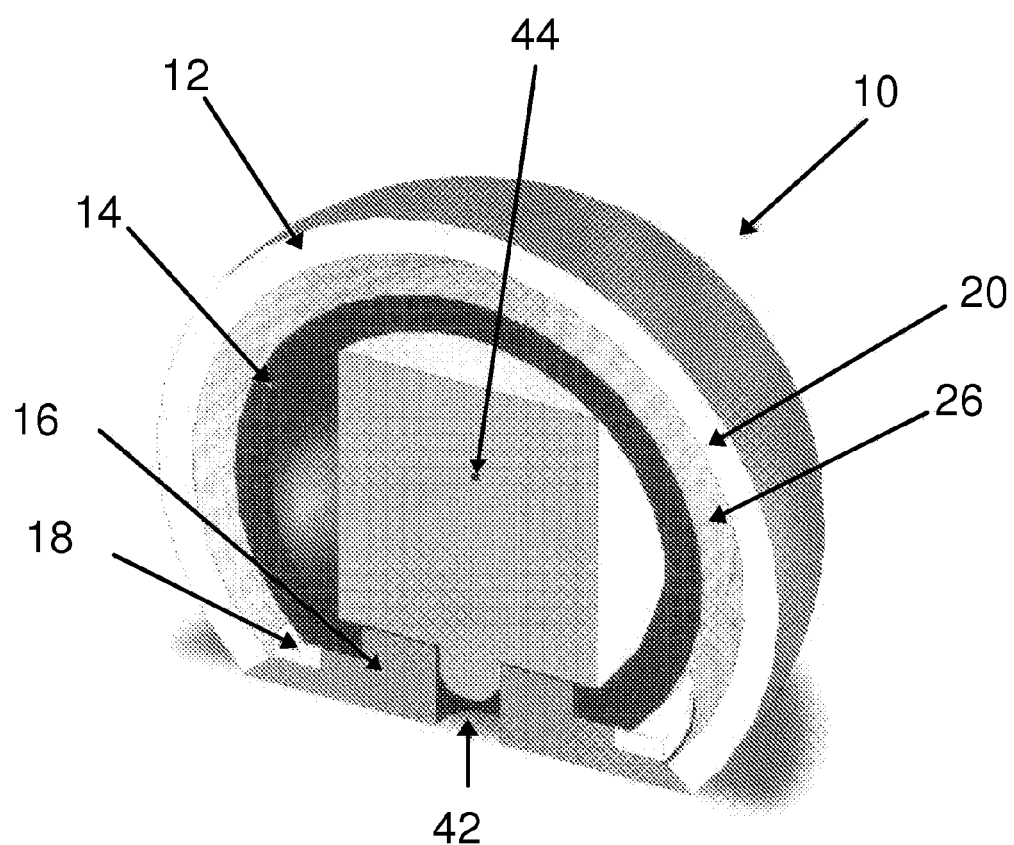
FIG. 2 is a cross-sectional view of the cursor control device in accordance with the invention.

Referring to the accompanying drawings wherein like reference numbers refer to the same or similar elements, FIG. 1 is a perspective view of a cursor control device or computer mouse in accordance with the invention which is designated generally as 10. The cursor control device 10 includes an outer substantially spherical casing 12 lacking a lower portion (see FIG. 3), an inner substantially spherical casing 14 also lacking a lower portion (see FIG. 4), a base 16 engaging with and supporting the outer and inner casing 12, 14 and a ring 18 arranged in connection with the base 16 (see FIG. 2). The outer and inner casing 12, 14 are engaged with the base 16 to be at a distance from one another in a rest position such that there is a space therebetween, as shown in FIG. 2.

Outer casing 12 may be made of a flexible material and is provided with a conductive mesh 20 on an inner surface. For example, outer casing 12 may be made of an elastomeric material, such as rubber, or a progressive resistance material. Regardless of the material from which the outer casing 12 is made, it preferably should be sufficiently resilient to enable it to return to its original shape when an applied force is no longer present. If made from an elastomeric material, the material does not have to have a uniform composition throughout the outer casing 12 but rather, different portions of the outer casing 12 can have different properties of elasticity.

Figure 3:
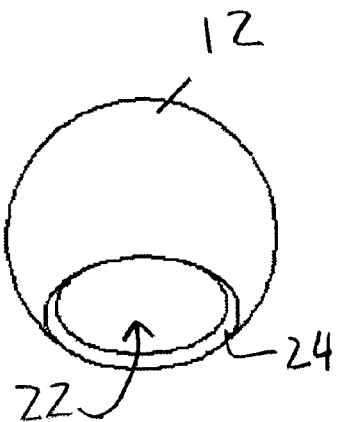
FIG. 3 is a bottom perspective view of an outer casing in the cursor control device in accordance with the invention.

Mesh 20 may be made of a conductive metallic material. Preferably, the conductive mesh 20 is formed in such a manner to enable the entire outer casing 12 to maintain its flexibility. As shown in FIG. 3, an opening 22 at the lower portion of the casing 12 is formed with an angled surface 24 which contacts an angled surface of the base 16 and is supported thereby.

Figure 4:
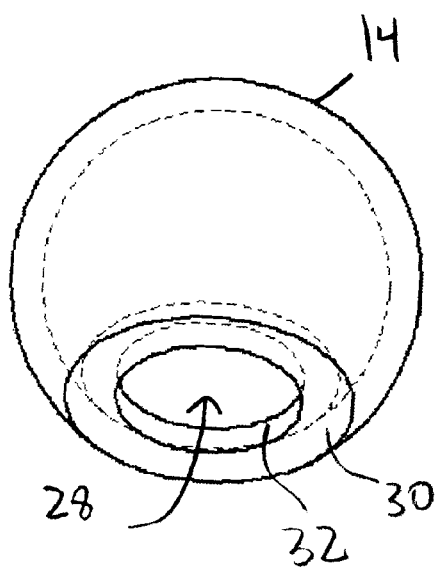
FIG. 4 is a bottom perspective view of an inner casing in the cursor control device in accordance with the invention.

Inner casing 14 may be made of a rigid or hard material such as plastic and is provided with a coating or covering 26 on its outer surface. This covering 26 may be a conductive substrate or conductive mesh, e.g., made of a conductive metallic material. As shown in FIG. 4, an opening 28 at the lower portion of the casing 14 is formed with a flat surface 30, i.e., extending in a flat plane, such that the inner casing 14 contacts a flat surface of the base 16 and can be supported thereby. A thread is formed on a peripheral surface 32 of the inner casing 14 defining the opening 28 to enable the inner casing 14 to be secured to the base 16.

Figure 5:
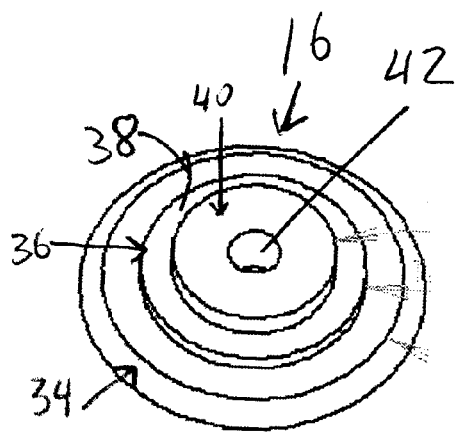
FIG. 5 is a bottom perspective view of a base in the cursor control device in accordance with the invention.

Referring to FIG. 5, the base 16 preferably has a unitary or integral form and includes three different cross-sectional portions. A first, lowermost portion 34 is annular and has a flat, substantially circular lower surface and a substantially circular upper surface having a smaller diameter than the lower surface whereby the peripheral surface of the first portion tapers inward from the lower surface to the upper surface. The second, intermediate portion 36 is also annular and has a substantially uniform diameter which is less than the diameter of the upper surface of the lowermost portion 34. Since the intermediate portion 36 has a smaller diameter than the diameter of the upper surface of the lowermost portion 34, a support ledge 38 is formed by the upper surface of the lowermost portion 34 which supports the ring 18. The third, uppermost portion 40 is also annular and has a substantially uniform diameter smaller than the diameter of the intermediate portion 36. As such, part of the upper surface of the intermediate portion 36 is exposed and receives and supports the inner casing 12 thereon. In view of the annular structure of the three portions 34, 36, 40 of the base 16, there is an aperture 42 leading to the bottom of the base 16, the purpose of which is explained below. The exact form of the base 16 and its various portions is not limited to those described and can be varied as desired by the designer.

A thread is formed on the outer peripheral surface of the uppermost portion 40, e.g., a male thread if the inner casing 14 is provided with a female thread on the peripheral surface 32 thereof defining the opening 28 at the lower portion thereof. Instead of cooperating threads on the inner casing 14 and base 16, other cooperating mechanisms to enable the inner casing 14 to securely and removably or permanently engage with the base 16 are also envisioned to be within the scope and spirit of the invention.

The ring 18 may be an integral annular structure or alternatively, may be comprised or two halves connected together. In the latter case, the halves may be provided with an appropriate attachment mechanism to enable them to be connected together, for example, snapped together. Each half is designed to be connected to opposite ends of the conductive mesh 20 which lines the inner surface of the outer casing 12.

The ring 18 is connected to the mesh 20 and thus one function of the ring 18 is to provide a structural connection between the outer casing 18 and the rest of the cursor control device 10. Also, the ring 18 should be made of an at least partially if not completely conductive material, e.g., a conductive metal, to thereby provide a conductive link between the outer casing 12 and the internal, electrical structure, i.e., the conductive covering 26 on the inner casing 14. As an alternative to being entirely conductive, the ring 18 may include conductive paths to enable such a conductive link to be formed. The inner casing 14 may overlie and rest on the ring 18 as shown in FIG. 2.

Cursor control device 10 also includes hardware 44 which is preferably arranged inside the inner casing 14. Hardware 44 may be supported on or by the inner casing 14 and/or the base 16 and includes conventional structure to enable the movement of the cursor control device 10 relative to a surface on which it is being moved to be recognized. This structure may be optical, i.e., by emission and reception of a beam through the aperture 42, or mechanical. Hardware 44 is also arranged to transform any contact between the conductive mesh 20 on the inner surface of the outer casing 12 and the conductive covering 26 on the outer surface of the inner casing 14 into an electric signal indicative of a cursor control command, such as a "clicking" of the cursor control device 10. This contact may result in the closure or completion of a circuit including the conductive mesh 20 and conductive covering 26 which is detected by hardware 44. Alternatively, the contact can result in the opening of a circuit including the conductive mesh 20 and conductive covering 26 which is detected by hardware 44.

Hardware 44 is protected from damage by virtue of the rigidity of the inner casing 14, i.e., the user of the cursor control device 10 is prevented from squeezing and damaging the hardware 44 since the user can squeeze the cursor control device 10 only until the outer casing 12 is pressed against the inner casing 14. Although the illustrated embodiment shows the inner casing 14 as being spherical, it may alternatively be a solid structure with the hardware 44 paced into one or more cavities therein. In this case, the outer surface of such a solid structure should preferably conform to the general shape of the inner surface of the outer casing 12.

In use, the cursor control device 10 functions very similar to a conventional wireless computer mouse in that it is wirelessly connected to a computer via the hardware 44 and appropriate communications hardware and software in the computer. (Nevertheless, it is also envisioned that a wire could be provided leading from hardware 44 to the computer.) Hardware 44 is thus capable of processing movement of the device 10 relative to its supporting surface and sending a signal indicative of this movement to the computer to enable the computer to move the position of an indicator or cursor on a screen associated with the computer.

Ideally, a user will grasp the device 10 with their palm and all of their fingers against the device 10. When the user wants to execute a function graphically depicted on the screen, the user positions the cursor at a specific location by moving the device 10 and then presses the outer casing 12 inward until resistance is felt indicating that the outer casing 12 is against the inner casing 14, and then releases or maintains the pressure. The magnitude of the pressure being applied must exceed a pre-determined amount to be considered a squeeze. This pre-determined amount can either be implemented by constructing the sensor arrangement, i.e., the system which senses contact between the conductive mesh 20 and the conductive covering 26, to detect only contact arising from pressure applied to the outer casing 12 which is above a threshold, or by arranging the hardware 44 to monitor the application of pressure being applied to the outer casing 12 and generate a signal only when the pressure is determined to be above a threshold.

Contact between the outer and inner casings 12, 14 causes completion of a circuit which is detected by the hardware 44, which is interpreted as a "click" when lasting for a pre-determined amount of time and followed by absence of contact indicative of a release of pressure. This causes hardware 44 to generate a signal indicative of this "click" and send the signal to the computer. Contact between the outer and inner casings 12, 14 is interpreted as a "scroll down" motion when continuous contact is detected, i.e., when the pressure is maintained more than a pre-determined amount of time, and a signal is generated by hardware 44 and sent to the computer indicative of this "scroll down" motion.

In one embodiment, scrolling or throttle activity can be achieved by using a strain gauge that measures the change in electrical or mechanical properties whereby a desired level of scroll or throttle can be detected based on the change in electrical or mechanical properties. Thus, the user would apply different pressure to the outer casing 12 to cause different duration of scrolling and throttling.

A "double-click" indication can be created using cursor control device 10 simply by performing two "click" motions. To differentiate between two independent "clicks" and a "double-click", the pre-determined time period between sequential clicks can be regulated as desired so that, for example, a time difference less than the pre-determined time period is indicative of a "double-click" and a time difference greater than or equal to the pre-determined time period is indicative of two "clicks".

Text selection using cursor control device 10 can be accomplished by squeezing the outer casing 12 against the inner casing 14 in combination with movement of the device 10.

An advantage obtained by the cursor control device 10 when is that the user is performing a hand resistance exercise while using the computer. Since a significant number of people use computers continually either at work or at home, the cursor control device 10 thereby provides an unobtrusive way for these people to exercise their hands. This particular application could not only benefit the general public but also play a role for patients requiring hand physical therapy. Moreover, children who might not have the attention span to use a simple hand therapy device could now interact with a computer or other type of visual display device using the apparatus while engaged unconsciously in a strengthening exercise.

The invention thereby facilitates hand resistance training which is a form of strength training in which each effort is performed against a specific opposing force generated by elastic resistance (i.e., resistance to being stretched or bent). Exercises are isotonic if a body part is moving against the force. Exercises are isometric if a body part is holding still against the force. By utilizing a spherical or any concentric shape made from a type of material that creates resistance and maintains it, the user can create the two different exercises. Specific examples include when a user wants to simulate the "click", she will squeeze the outer casing 12 against the inner casing 14 using all the muscles in her left or right hand followed by a release of pressure, which essentially creates an isotonic exercise; and when a user wants to simulate the "scroll down" motion, she will squeeze the outer casing 12 against the inner casing 14 and hold the outer casing 12 in this position which will create an isometric exercise. Another very common task among computer users is a "double click" which, as noted above, could be simulated by a double squeeze of the outer casing 12 against the inner casing 14, i.e., a squeeze followed by a release and then another squeeze followed by a release where the time between each squeeze is predetermined.

In one embodiment, pressure applied to different portions of the outer casing 12, causing contact with the inner casing 14, can be interpreted to constitute different desired actions. For example, a right-click could be simulated by applying force only on the top of the outer casing 12, with an absence of force at other portions of the outer casing 12. This will introduce a separate, small area contact between the inner surface of the outer casing 12 and the outer surface of the inner casing 14. Alternatively, the right-click might be simulated by applying force only to a right side of the outer casing 12. Since the natural hand squeeze is around the sphere, i.e., around the entire outer casing 12, it is possible to correlate the application of force or pressure applied to only portions of the outer casing 12 to specific intended cursor actions.

Resistance exercise, such as made possible when using the cursor control device 10 in accordance with the invention, is optimally used to develop the strength and size of skeletal muscles. Properly performed, strength training can provide significant functional benefits and improvement in overall health and well-being including increased bone, muscle, tendon and ligament strength and toughness, improved joint function, and reduced potential for injury. An attendant benefit of the use of the cursor control device 10 in accordance with the invention is better blood circulation. Moreover, since the cursor control device 10 fosters a full hand exercise, it may also alleviate repetitive strain injury arising from a computer user's use of a conventional computer mouse.

It is envisioned that different cursor control devices 10 will be formed requiring different levels of compressive force to enable their use. The required level of compressive force can be regulated by appropriate selection of the material and dimensions of, for example, the outer casing 12. To differentiate between different devices 10 requiring different levels of compressive force, the outer casing 12 of the devices may be colored or otherwise marked differently. Additionally, the dimensions of the space between the outer and inner casings 12, 14 can be adjusted to vary the required squeezing force to effect contact between the conductive mesh 20 on the outer casing 12 and the conductive covering 26 on the inner casing 14. One or more apertures can be provided in the outer casing 12 or base 16 leading from the ambient atmosphere to this space and the size of the aperture(s) varied to thereby enable regulation of the required compressive force to effect contact between the conductive mesh 20 and the conductive covering 26. In this embodiment, air would exit from the space with each squeeze and return once pressure is released.

It is also envisioned that when hand resistance exercise is needed, e.g., for patients requiring physical therapy for their hands, interactive games could be designed for the computer or other display device associated with the cursor control device 10. These games could require specific actions to be performed using the cursor control device 10, namely numbers and patterns of squeezes, in order to cause the user to exercise their hand without consciously recognizing they are exercising.

The dimensions of the cursor control device 10 may be selected based on commercial standards for a computer mouse. The cursor control device 10 ideally should be able to be easily grasped by a typical user such that all of the user's fingers can squeeze the device while the user's palm surrounds the device. Different sizes of the cursor control device 10 can also be formed for use by people with different physical characteristics, i.e., hand size.

Although outer and inner casings 12, 14 are described above as being substantially spherical, any other concentric shapes can also be used in the invention. One factor to consider when selecting the shape of at least the outer casing 12 is ergonomics. On the other hand, to provide a distinctive yet still effective device, the outer casing could be in the form of a flexible figurine with an inner casing having a form substantially conforming to the form of the figurine but smaller to enable it to be situated inside of the outer casing while maintaining a space between the inner and outer figurine-shaped casings. Such a cursor control device would be an elongated device and could be used in either a horizontal orientation or vertical orientation.

In the embodiment of the cursor control device 10 described above, a squeeze is detected based on contact between the conductive mesh 20 of the outer casing and the conductive covering 26 on the inner casing 14. Alternative sensor arrangements are envisioned to detect a squeeze. Basically, the sensor arrangement should be able detect an inward movement of the outer casing 12 relative to the inner casing 14 or squeezing movement of the outer casing 12, with the inner casing 14 limiting the inward or squeezing movement. An alternative sensor arrangement is a strain gage system which is arranged in or on the outer casing 12 or alternatively, in or on the inner casing 14. The strain gage arrangement may be designed to convert mechanical motion of the outer casing 12 or simply pressure applied to the outer casing 12 (which is thus not required to be made of a flexible material) into a signal indicative of a squeeze, i.e., when the characteristics of the mechanical motion satisfy certain criteria. A change in capacitance, inductance or resistance is proportional to the strain experienced by the sensor arrangement and this change could be converted into an indication of the type of action the user desires to perform on the screen associated with the computer connected to the device. The hardware inside the inner casing would be coupled to this sensor arrangement and provided with the appropriate means to communicate with the sensor arrangement and convert measurement by the sensor arrangement into indications of the user's desired actions.

Cursor control device 10 can also be used solely for exercise, without its movement and application of pressure to the outer casing 12 causing motion of a cursor on a screen of a computer and effecting of commands via the computer. Specifically, if the cursor control device is picked up and elevated above the substrate on which it is normally used, then there would not be any reflection of light from the substrate which enables control of the cursor on the screen. Therefore, the hardware 44 in the cursor control device will not process any signals. The user can exercise with the cursor control device without inadvertently causing operation of the computer.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A cursor control device, comprising:
   an outer casing;
   an inner casing arranged inside of said outer casing;
   a sensor arrangement for detecting application of pressure to said outer casing above a pre-determined magnitude;
   a base having a flat lower surface, said base supporting said inner and outer casings; and
   hardware arranged in connection with said inner casing and coupled to said sensor arrangement for converting the application of pressure to said outer casing detected by said sensor arrangement into signals indicative of the application of such pressure which are provided to a computer having a screen with the cursor thereon, and wherein a portion of said base has a first thread thereon and a portion of said inner casing has a second, complementary thread thereon to enable said inner casing and said base to be removably connected together via said threads.

2. The device of claim 1, wherein said inner and outer casings have the same general shape.

3. The device of claim 1, wherein said inner and outer casings are substantially spherical.

4. The device of claim 1, wherein said outer casing has an inner surface, said inner casing having an outer surface facing said inner surface of said outer casing, said sensor arrangement comprises a conductive mesh arranged on said inner surface of said outer casing, a conductive covering arranged on said outer surface of said inner casing and an at least partially conductive ring arranged in connection with said base and electrically connecting said conductive mesh and said conductive covering, said outer casing being spaced from said inner casing to define a space therebetween whereby application of pressure to a portion of said outer casing above the pre-determined magnitude causes said conductive mesh at said portion to contact said conductive covering and complete an electrical circuit, said hardware detecting the completion of the circuit and providing the signals indicative of the application of pressure to said outer casing based thereon.

5. The device of claim 1, wherein said outer casing comprises a flexible material.

6. The device of claim 1, wherein said outer casing comprises a resilient, elastomeric material.

7. The device of claim 1, wherein said inner casing comprises a rigid material.

8. A cursor control device, comprising:
   an inwardly squeezable outer casing having an inner surface;
   an inner casing arranged inside of said outer casing and having an outer surface facing said inner surface of said outer casing, said inner casing being rigid and limiting inward squeezing of said outer casing;
   a sensor arrangement for detecting application of pressure to said outer casing above a pre-determined magnitude, said sensor arrangement being arranged at least partially on said inner surface of said outer casing or said outer surface of said inner casing; and
   hardware coupled to said sensor arrangement for converting the application of pressure to a portion of said outer casing detected by said sensor arrangement into signals indicative of the application of such pressure which are provided to a computer having a screen with the cursor thereon.

9. The device of claim 8, wherein said inner and outer casings have the same general shape.

10. The device of claim 8, wherein said inner and outer casings are substantially spherical.

11. The device of claim 8, further comprising a base having a flat lower surface, said base supporting said inner and outer casings.

12. The device of claim 11, wherein said inner casing is removably connected to said base.

13. The device of claim 12, wherein a portion of said base has a first thread thereon and a portion of said inner casing has a second, complementary thread thereon to enable said inner casing and said base to be removably connected together via said threads.

14. The device of claim 11, wherein said sensor arrangement comprises a conductive mesh arranged on said inner surface of said outer casing, a conductive covering arranged on said outer surface of said inner casing and spaced from said conductive mesh in the absence of pressure being applied to said outer casing and means for electrically connecting said conductive mesh and said conductive covering, whereby application of pressure to a portion of said outer casing above the pre-determined magnitude causes said conductive mesh at said portion to contact said conductive covering and complete an electrical circuit, said hardware detecting the completion of the circuit and providing the signals indicative of the application of pressure to said outer casing based thereon.

15. The device of claim 14, wherein said means comprise an at least partially conductive ring arranged on said base.

16. The device of claim 8, wherein said outer casing comprises a flexible material.

17. The device of claim 8, wherein said inner casing comprises a rigid material.

18. A cursor control device, comprising:

an outer casing having an inner surface;

an inner casing arranged inside of said outer casing and having an outer surface facing said inner surface of said outer casing;

a base having a flat lower surface, said base supporting said inner and outer casings;

a sensor arrangement for detecting application of pressure to said outer casing above a pre-determined magnitude, said sensor arrangement comprising:

a conductive mesh arranged on said inner surface of said outer casing, a conductive covering arranged on said outer surface of said inner casing, and an at least partially conductive ring arranged in connection with said base and electrically connecting said conductive mesh and said conductive covering, said outer casing being spaced from said inner casing to define a space therebetween whereby application of pressure to a portion of said outer casing above the pre-determined magnitude causes said conductive mesh at said portion to contact said conductive covering and complete an electrical circuit; and hardware arranged in connection with said inner casing and coupled to said sensor arrangement for converting the application of pressure to said outer casing detected by said sensor arrangement into signals indicative of the application of such pressure which are provided to a computer having a screen with the cursor thereon, said hardware detecting the completion of the circuit and providing the signals indicative of the application of pressure to said outer casing based thereon.

19. The device of claim 18, wherein said inner casing is removably connected to said base.

20. The device of claim 18, wherein said outer casing comprises a flexible material or a resilient, elastomeric material and said inner casing comprises a rigid material.

\* \* \* \* \*